(No Model.)
R. W. KELLEN.
SAW TOOTH.
No. 295,649. Patented Mar. 25, 1884.
Fig. 1.
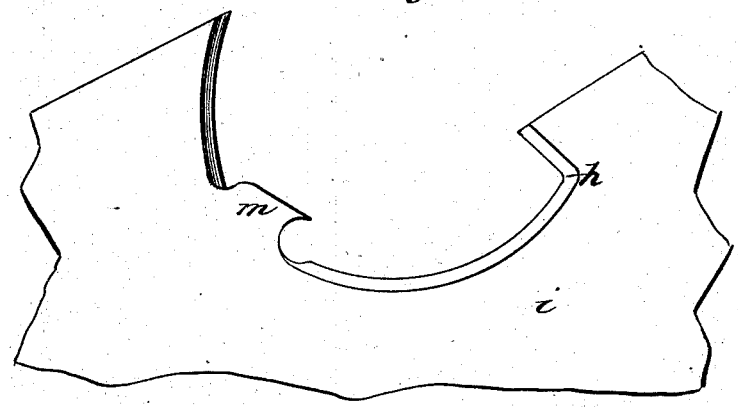
Fig. 2.
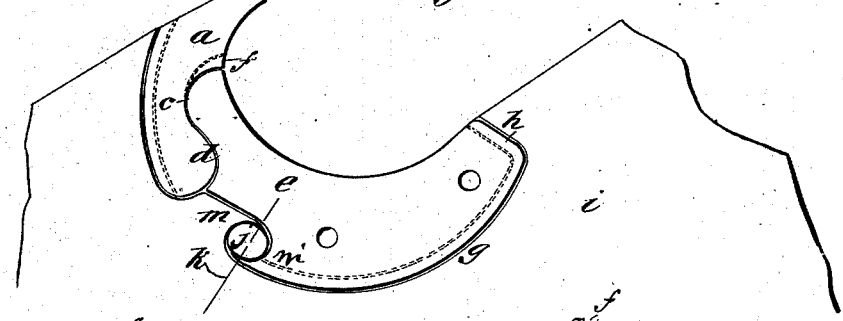
Fig. 3.     Fig. 4.
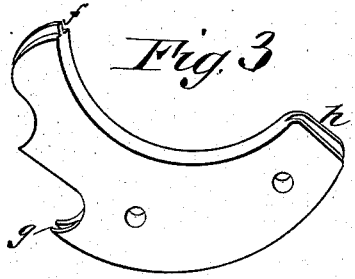   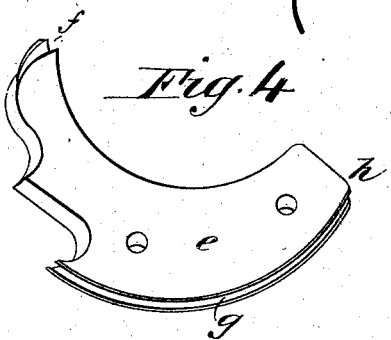
Fig. 5.
WITNESSES:
Francis McArdle
C. Sedgwick
INVENTOR:
R. W. Kellen
BY Munn & Co
ATTORNEYS.

UNITED STATES PATENT OFFICE.

ROBERT W. KELLEN, OF ALBION, CALIFORNIA.

SAW-TOOTH.

SPECIFICATION forming part of Letters Patent No. 295,649, dated March 25, 1884.

Application filed June 5, 1883. (No model.)

*To all whom it may concern:*

Be it known that I, ROBERT W. KELLEN, of Albion, Mendocino county, California, have invented a new and useful Improvement in Insertible-Tooth Saws, of which the following is a full, clear, and exact description.

My invention consists of improvements in the form and contrivance of the tooth, and the shank for securing the tooth in the saw, whereby it is designed to secure the teeth more substantially and firmly than as at present arranged, as hereinafter fully described.

Reference is to be had to the accompanying drawings, forming part of this specification, in which similar letters of reference indicate corresponding parts in all the figures.

Figure 1 is a side elevation of a portion of a saw-plate with the notch as I propose to make it for the tooth and the shank. Fig. 2 is a side elevation of the same portion of the plate with the tooth and shank in place. Fig. 3 is a perspective view of the shank. Fig. 4 is another perspective view of the shank, and Fig. 5 is a perspective view of the tooth.

I make the tooth with a curved and grooved back, $b$, as commonly made; but the front portion I make in the ogee form shown at $c\ d$, and shape the shank $e$ correspondingly, so that the inner part of the tooth at $d$ being wider than at $c$ insures the tooth against the possibility of flying out so long as the shank remains in its place, and at the lip of the shank I make a long and substantial nib, $f$, which enters a deep groove in the tooth, to hold said tooth securely against being pressed out laterally by the file. To secure the shank in the saw-plate $i$, I groove it along the back $g$, and also extend the groove at the end $h$, to fit on a corresponding $\wedge$-rib of the saw-plate $i$, and below the inner end of the tooth I have an oval-shaped hole, $j$, formed between the shoulder of said shank and the spur $m$ of the plate, that is wider in the direction of line $k$ than the other way, so that the oval rivet, when turned a quarter-revolution, to bear against the opposite hook-extensions $m\ m'$, will press harder in the direction at right angles to said line than along it, and thus draw the shank down more firmly on the line $c\ d$ of the tooth. The shank is sufficiently slack to enter its place freely before the rivet is put in. After the shank $e$ and tooth are fitted to place, the rivet is inserted with its major axis in the direction of line $k$, and is then turned a quarter of a revolution, so that its prolate ends bear with a wedging cam action against the spur $m$ of the saw-plate on one side and the shoulder $m'$ of the shank $e$ on the other, thus drawing the shank firmly down to place and tightly securing the tooth in place. The rivet is then secured in place by upsetting. With respect to the peculiar relation of the shank $e$ to the tooth $a$ along the line $c\ d$, I would state that I am aware that it is not broadly new to enlarge the inner end of the tooth and retain it by a sharp angular shoulder of the shank, as shown in the patent to Brooke, June 18, 1878; and I am further aware that a rivet or screw bearing against the spur of the saw-plate and shoulder of the shank is not new in this connection. When, however, the shank hooks over the tooth with a sharp angle, I find that when the rivet gets loose from usage the shoulder loosens on the tooth, and the latter is alternately jammed backward when in the log, and then is thrown outwardly by centrifugal action when out of the log, so that it soon becomes entirely twisted out of place and dislodged. By making the joint between the tooth and shank an ogee or double-reversed curve, even if the rivet and shank loosen, the centrifugal action of the tooth causes its large and gradually-curved inner end to wedge up between the upper end of the shank and saw-plate and automatically tighten itself. By making the rivet oval and inserting it as described I also secure a much tighter and more substantial fitting of the parts in the first adjustment of the teeth.

What I claim is—

1. The combination, with the saw-plate having spur $m$, of the saw-tooth $a$, the shank $e$, with shoulder $m'$, and the oval rivet adapted to be inserted and turned as described, to lock the parts in place by a cam action, as set forth.

2. The combination, with the cam-plate having spur $m$, of the tooth $a$, made wider at its lower end, and having its shank-face constructed with an ogee curve, the shank having shoulder $m'$ and a corresponding ogee curve next to the tooth, and the oval rivet inserted between the bearings $m$ and $m'$, and turned to lock the parts by a cam action, as set forth.

ROBERT W. KELLEN.

Witnesses:
GEO. LAMMERS,
A. HEESER.